No. 617,160.  
J. H. HOOVER.  
ANIMAL TRAP.  
(Application filed July 28, 1898.)  
(No Model.)  
Patented Jan. 3, 1899.  
2 Sheets—Sheet 1.

Attest.  
Helen Graham  
Fay Graham.

INVENTOR  
J. H. HOOVER  
by L. P. Graham  
his attorney

No. 617,160. Patented Jan. 3, 1899.
J. H. HOOVER.
ANIMAL TRAP.
(Application filed July 28, 1898.)
(No Model.) 2 Sheets—Sheet 2.
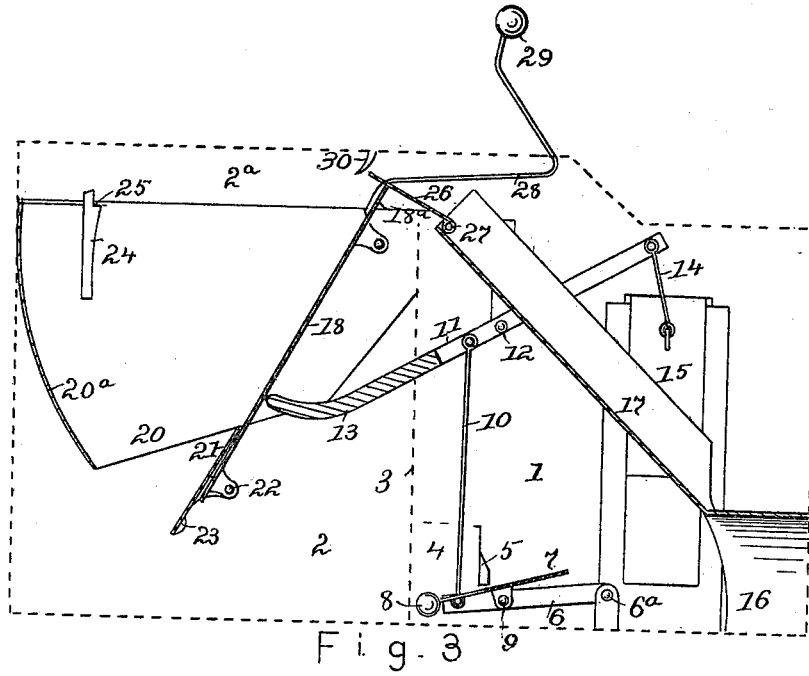
Fig. 3.
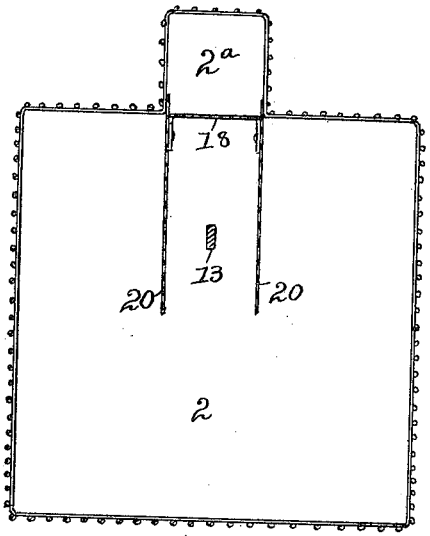
Fig. 4.
Fig. 5.
Attest
Helen Graham
Fay Graham
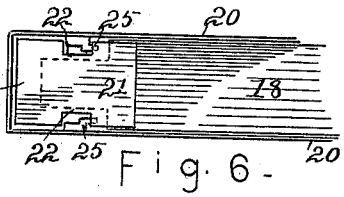
Fig. 6.
INVENTOR
J. H. HOOVER,
by L. P. Graham
his attorney

UNITED STATES PATENT OFFICE.

JAMES H. HOOVER, OF NEAR ARGENTA, ILLINOIS.

ANIMAL-TRAP.

SPECIFICATION forming part of Letters Patent No. 617,160, dated January 3, 1899.

Application filed July 28, 1898. Serial No. 687,086. (No model.)

*To all whom it may concern:*

Be it known that I, JAMES H. HOOVER, of Macon county, near Argenta, in the State of Illinois, have invented certain new and useful Improvements in Animal-Traps, of which the following is a specification.

This invention relates to victim-set traps. It is particularly designed to catch rats and the like. It is exemplified in the structure hereinafter described, and it is defined in the appended claims.

Figure 1:
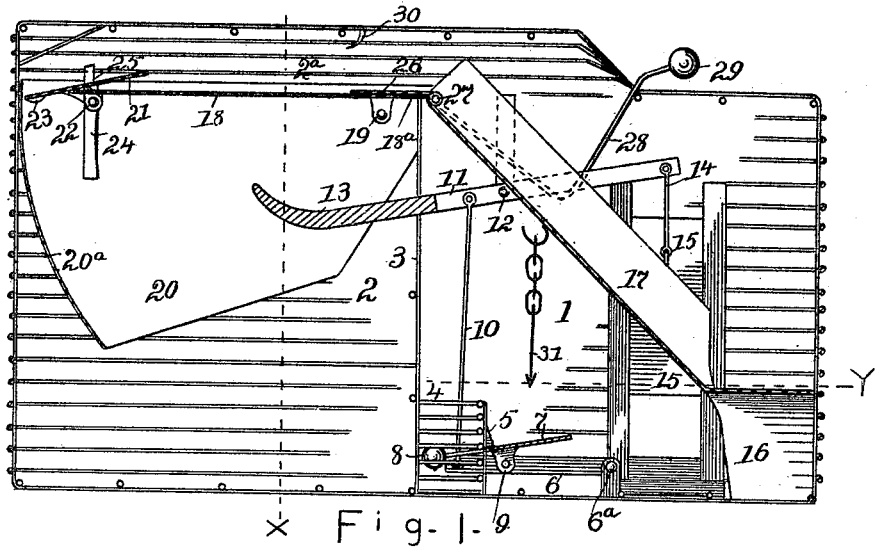
Figure 2:
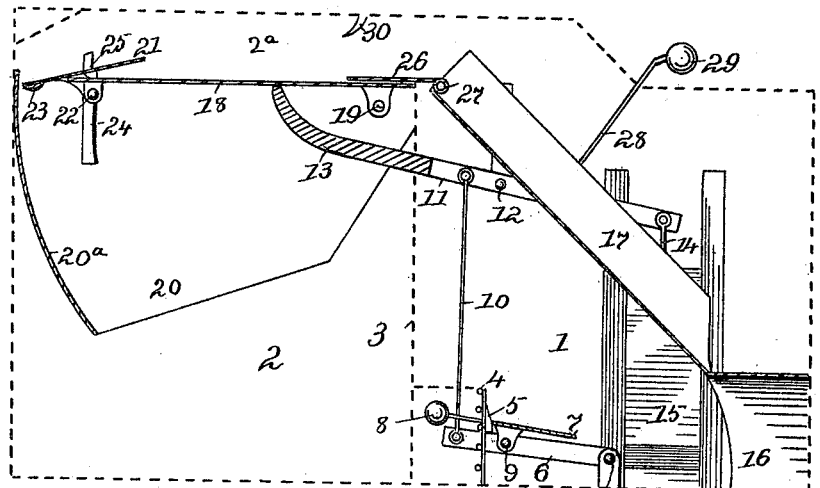

In the drawings forming part of this specification, Figure 1 is a central vertical section through the different compartments of the trap, showing the trap set. Fig. 2 is a similar section showing the trap thrown. Fig. 3 is a like section showing the trap in act of resetting. Fig. 4 is a vertical transverse section on line X in Fig. 1. Fig. 5 is a horizontal section on line Y in Fig. 1. Fig. 6 is a plan of certain details of the resetting mechanism.

The walls of the trap are preferably made of pieces of wire latticed at suitable intervals, and the inclosure is subdivided into two compartments and a passage-way connecting one compartment with the other. One compartment is provided with trap-doors and trigger mechanism. The other compartment acts as a cage to hold the animals caught in the trap-compartment until it suits the convenience of the person in charge of the trap to kill or otherwise dispose of them, and the passage-way is so constructed that an animal caught in the trap-compartment cannot pass to the cage without resetting the trap.

The trap-compartment is shown at 1. The cage-compartment, which is shown at 2, is alongside the trap-compartment and separated by partition-wall 3. The passage-way $2^a$ leads from the upper portion of the trap-compartment through the upper portion of the cage. The sides of compartment 1 have animal-admitting openings which are provided with vertically-sliding doors 15. A bait-box 4 is fastened to the partition 3 at the transverse center thereof, and a catch 5 is fastened to or formed on the front wall of the bait-box. A pair of arms 6 are pivoted at $6^a$ to lugs extending upward from the bottom of the trap and they extend rearward on opposite sides of the bait-box. A trigger-plate 7 is pivoted at its ends to the arms 6, as shown at 9, in position to engage catch 5. It has a counterbalance-weight 8, that tends to hold it tilted backward into engagement with the catch, and it extends forward in position to be tilted clear of the catch by animals attempting to get at the bait in the box. A bail 11 is pivoted at 12 on opposite sides of the trap-compartment near the top thereof. It has an arm 13 extending from its transverse center into the cage-compartment beneath the passage-way. It connects in the rear of its pivot with the rear ends of arms 6 by means of rods 10, and its front ends connect with the doors by means of rods 14.

This mechanism constitutes the trap proper and its mode of operation is as follows: The doors are held raised by catch 5 acting through trigger-plate 7, arms 6, rods 10, bail 11, and rods 14. Bait is placed in the box and also, if desired, placed on the swinging rod 31. (Shown in Fig. 1.) Small portions of bait are also scattered through the trap and around the doors thereof. Suspicious animals may run in and out through the open doors, taking a nibble of bait now and then, until their confidence is strengthened sufficiently to permit them to approach the bait-box. As they near the bait-box they must depress the trigger-plate from contact with the catch, thus permitting the doors to fall closed. The animal inside is then securely imprisoned, but his fellows on the outside are effectually barred out, and so provision is needed for disposing of the captive and preparing for the admission of others. To do this, a landing 16 is made in the front end of the trap-compartment, and from the rear side of the landing an inclined way 17 leads up and back to the front end of passage-way $2^a$. Here a tilt-plate 18 is hinged between two smooth walls 20 and is ordinarily held in a horizontal position to form a floor for the passage-way and a separating-wall between the passage-way and the cage. The means employed to hold the swinging end of the tilt-plate raised consists of a trip-plate 21, located above the swinging end of the tilt-plate, hinged to the tilt-plate at 22 and counterweighted at its front end 23. The sides of the trip-plate adjacent to the hinges thereof are cut away or depressed, as shown in Fig. 6, and stop-ribs 24, having catch-surfaces 25, are fastened to the walls 20 in the line of travel of the cut-away portions of the trip-plate. The tilt-plate has swinging motion from the position shown in Figs. 1 and 2 to that shown in Fig. 3. It is carried upward by weights 29 on arms 28, and as it rises the front walls of the recesses of the trip-plate engage the stop-ribs 24 and the inclination of the ribs to the direction of travel of the plate forces the counterweighted end 23 upward until the cut-back surfaces 25 are reached, when the trip-plate swings over such surfaces with its forward end raised and forms a stop for the tilt-plate that can only be released by depressing the front end of the trip-plate. The forward end of the tilt-plate extends forward beyond the pivots of the plate and over such extension a hinged closure-plate 26 rests. The closure-plate is pivoted at 27 in the upper end of inclined way 17 and its rear end is raised across the passage-way by extension 18$^a$ of the tilt-plate whenever the rear or discharging end of the tilt-plate descends. Above the tilt-plate and slightly in the rear of the rear end of the closure-plate 26 is placed a set of teeth 30, which project downward and rearward from the upper wall of the passage-way.

When the doors of the trap fall closed, as shown in Fig. 2, the arm 13 of bail 11 swings upward to or nearly to the tilt-plate and the animal finds itself fastened in the trap-compartment with the tilt-plate locked in a horizontal position and the bail in position to partake of downward swing of the tilt-plate whenever it shall be released. Under these circumstances the animal climbs onto the landing 16, travels up incline 17, and walks out on the tilt-plate until he reaches trip-plate 21. As soon as he steps on plate 21 his weight overbalances weighted end 23 and swings the trip-plate clear of the stop-ribs 24. The tilt-plate then descends with a velocity that makes backward scramble of the animal well nigh ineffective and lands the victim into the cage-compartment, while at the same time depressing the rear end of the bail and opening the doors. As soon as the animal falls off the tilt-plate the weights 29 carry the plate back to its original position preparatory to a repetition of the operation. To make it entirely certain that the animal will go down with the tilt-plate when once the trip-plate is thrown, the initial downward motion of the tilt-plate is made to raise the closure-plate toward the teeth 30, and the closure-plate and teeth form a barrier that would prevent the animal from "crawfishing" if he should chance to have time to think of such a thing. The tilt-plate holds firmly in place until the animal reaches the trip-plate, and he goes out unhesitatingly and rapidly until he is so far beyond the pivot that he simply falls downward into the cage-compartment. As he goes down he forces bail 11 into the position shown in Fig. 3, thereby raising the doors above their normal open positions, and as the weighted arms 28 carry the tilt-plate back to its horizontal position the trigger-plate 7 swings into engagement with catch 5, the doors settle downward to their normal open position, and the trap is reset. To make it certain that the tilt-plate will swing downward far enough to reset the trap, a wall 20$^a$, concentric with the pivot of the tilt-plate, is made to connect walls 20 and descend far enough to compel a complete tilt of the plate before permitting escape of the animal into the cage. This condition is shown in Fig. 3.

The cage-compartment is to be provided with a suitable door for removing the animals, and an extra door may also be provided in the trap-compartment for convenience in placing the bait and adjusting the trigger mechanism.

What I claim is—

1. In a trap having a trap-compartment, an adjacent cage-compartment and a passage-way extending from the trap-compartment to the upper part of the cage-compartment, a tilt-plate hinged in the passage-way with its swinging end extended out over the cage-compartment and a trip-plate on the swinging end of the tilt-plate holding the tilt-plate in a horizontal position and releasable by the weight of an animal.

2. In a trap having a trap-compartment, an adjacent cage-compartment and a passage-way extending from the trap-compartment to the upper part of the cage-compartment, a tilt-plate hinged in the passage-way with its swinging end extended out over the cage-compartment, and a closure-plate at the pivot of the tilt-plate movable across the passage-way by the downward swing of the tilt-plate.

3. In a trap having a trap-compartment, an adjacent cage-compartment and a passage-way extending from the trap-compartment to the upper portion of the cage-compartment, a tilt-plate hinged in the passage-way with its swinging end extended out over the cage-compartment, a trip-catch on the swinging end of the tilt-plate releasable by the weight of an animal and a closure-plate near the pivot of the tilt-plate swingable across the passage-way by downward swing of the tilt-plate.

4. In a trap having a trap-compartment provided with a door, an adjacent cage-compartment and a passage-way extending from the trap-compartment to the cage-compartment, a tilt-plate hinged in the passage-way with its swinging end extended out over the cage-compartment, a trip-catch on the tilt-plate releasable by the weight of an animal and a pivoted arm connected with the door at one end and extending under the tilt-plate at the other end, substantially as set forth.

5. In a trap having a trap-compartment, a cage-compartment and a passage-way extending from the trap-compartment to the upper part of the cage-compartment, a tilt-plate hinged in the passage-way and extending out over the cage-compartment, a door for the trap-compartment, a connection between the door and the tilt-plate whereby downward motion of the plate will raise the door, and an end wall to the passage-way following the path of the end of the tilt-plate throughout the upper part of its swing, whereby the door must be entirely opened before the animal can escape from the passage-way, substantially as set forth.

In testimony whereof I sign my name in the presence of two subscribing witnesses.

JAMES H. HOOVER.

Witnesses:
 E. S. McDONALD,
 ROSA VOELCKER.